United States Patent [19]

Cousins

[11] 4,102,245
[45] Jul. 25, 1978

[54] DOOR FRAME TRUING APPARATUS

[75] Inventor: James R. Cousins, Washington, Pa.

[73] Assignee: Hallmor, Inc., Bethel Park, Pa.

[21] Appl. No.: 681,024

[22] Filed: Apr. 28, 1976

[51] Int. Cl.$^2$ ............................ B23C 1/20; B23C 9/00
[52] U.S. Cl. .................................. 90/12 R; 90/13 C; 90/15 R; 90/21 R; 51/35; 144/134 R; 144/136 R
[58] Field of Search ................... 90/12 R, 12 D, 15 R, 90/13 C, 21 R; 144/136 R, 134 A, 134 B, 136 G, 136 J, 137; 266/58; 51/35, 241 S; 408/91; 318/65, 282, 466, 467

[56] References Cited

U.S. PATENT DOCUMENTS

| | | | |
|---|---|---|---|
| 3,382,768 | 5/1968 | Mount | 90/12 R |
| 3,490,335 | 1/1970 | King | 90/21 R |
| 3,557,659 | 1/1971 | Harris | 90/12 R |
| 3,634,975 | 1/1972 | Hensley | 51/35 |
| 3,733,961 | 5/1973 | Reynolds | 90/13 C X |
| 3,935,788 | 2/1976 | Gilmore | 90/12 R |
| 3,939,610 | 2/1976 | Suzuki et al. | 51/35 X |

FOREIGN PATENT DOCUMENTS 753,176  7/1956  United Kingdom ................ 90/15 R

*Primary Examiner*—Othell M. Simpson
*Attorney, Agent, or Firm*—Parmelee, Miller, Welsh & Kratz

[57] ABSTRACT

A machine or apparatus has been devised for accurately reconditioning or truing the sealing rim or flange of a door or window frame of a heavy piece of equipment, such as a furnace or coke oven that is subjected to relatively high and variable temperatures. The apparatus has a base-supporting and furnace-mounting frame, and movable secondary and head frames. The head frame carries a milling means that extends centrally through the other frames, and the secondary and head frames are mounted for back and forth movement in a supported relation on and along the base frame in such a manner that the milling means may be advanced along the sealing flange to be trued or planed. The movement of the head frame on and with respect to the lower or secondary frame and of the latter with respect to the base frame may be controlled by pre-setting the advancing movement effected by motor drive means in such a manner as to provide a progressive advance of the milling means along the full extent of the sealing flange.

5 Claims, 19 Drawing Figures

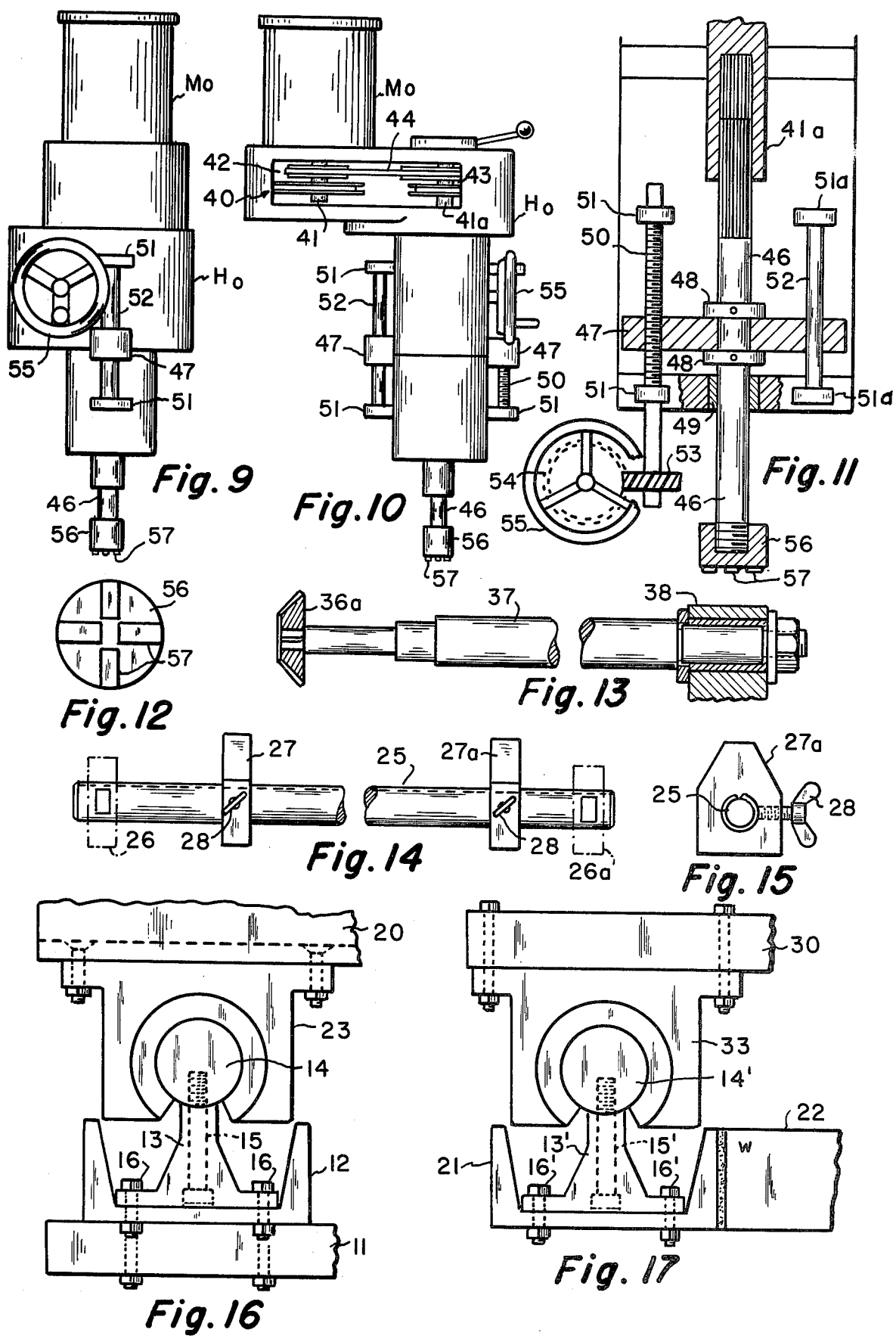

DOOR FRAME TRUING APPARATUS

BACKGROUND OF THE INVENTION

1. Field of the Invention

This invention pertains particularly to a portable, quickly mounted and dismounted machine for in place truing a sealing door rim, flange or the like of a furnace or oven and particularly, to a transportable surface milling device or machine for truing the sealing flange of a coke oven door frame and the like.

2. Description of the Prior Art

In the utilization of furnaces or ovens such as coke ovens, it has been necessary, in view of present day environmental requirements, to maintain an accurate sealing of the door utilized therewith. Due to variable and relatively high temperatures encountered in utilizations of this type, it has become necessary to rather frequently true, cut, grind, hone or mill-down the engaging sealing surfaces of the door and the rim or flange of its frame to re-fit them. Since the door can be easily removed, it presents no particular problem in truing. However, there is a definite problem from the standpoint of the framing sealing rim or flange about the door or window opening. That is, it has been necessary to employ so-called hand-held devices in an attempt to true the flange or rim. Difficulty has been encountered in accomplishing this accurately.

There has thus been a definite need for some form of device that will accurately and more or less automatically accomplish a truing or milling operation, and which may be pre-set for any desired amount of surface removal and in such a manner as to selectively advance its grinding or milling means progressively along and substantially continuously effect a truing operation on and about the sealing flange of a fixedly positioned piece of equipment. There has been a need for an apparatus which can be secured in position over a furnace or over door or window opening and which will be efficient in effecting a truing, grinding or milling operation on a sealing flange, without depending essentially on the manual strength, steadiness and skill of an operator.

SUMMARY OF THE INVENTION

It has thus been an object of the invention to analyze the factors involved in the above described problem and to devise a practical solution thereto in the form of a transportable, substantially automatic truing apparatus or device.

Another object has been to determine the requirements of a machine for truing a sealing flange and to devise a relatively simple, efficient and inexpensive apparatus that will accomplish the desired results.

Another object has been to provide a machine for quickly and effectively accomplishing an accurate truing of a sealing surface of a flange or rim at the mounted, stationary location or site of a furnace or oven.

Another object of the invention has been to develop a truing apparatus which may be securely mounted over a sealing flange that is to be trued and which, after the truing operation, may be dismounted from its operating position, portaged and set-up at another location.

A further object of the invention has been to devise a truing machine or device that may be pre-set to selectively and progressively advance along a sealing flange and mill it without requiring the manual strength and skill of an operator to maintain a proper operating and advancing movement with respect to the flange.

A still further object has been to develop a truing machine that employs a removable mountable stationary base or support frame, a pair of back and forth movable frames operatively carried on the base frame, and a milling unit that is carried by an outermost movable frame and that is adapted to advance along a sealing flange to be trued by relative and selective movements of the movable frames.

These and other objects of the invention will appear to those skilled in the art from the illustrated embodiment and the claims.

BRIEF DESCRIPTION OF THE DRAWINGS

In the drawings.

FIG. 9 is a front view in elevation showing a flange or rim milling head or unit in a vertically extending operating position;

FIG. 10 is a vertical view on the same scale as and of the milling head of FIG. 9, taken at right angles with respect thereto, and showing it in a right side elevation from the standpoint of FIG. 1;

FIG. 11 is a front, partially sectioned, vertical view showing means for vertically adjusting the milling head or unit of FIG. 9;

FIG. 12 is a bottom plan view showing the construction of a cutting element carrying head portion of the milling head or unit of FIGS. 9 and 11, inclusive;

FIG. 13 is an enlarged fragmental side view illustrating the journaling of a typical frame-moving screw shaft that is motor-driven in the manner indicated in FIG. 8;

FIG. 14 is a side fragmental view on the scale of FIG. 13 showing details of the typical construction of a movement controlling rod for frames of the machine, with particular reference to transverse and longitudinal, back and forth movement of movable intermediate or secondary and head frames of the machine;

FIG. 15 is an end detail on the scale of FIG. 14, taken endwise of such figure to illustrate a typical construction of adjustable stops for operating fingers of micro control switches;

FIG. 16 is an enlarged end fragment, particularly showing the construction and positioning of guide rail means which, as shown in FIG. 1, is mounted to guide a movable intermediate frame of the apparatus of FIG. 1 in its transverse back and forth movement;

FIG. 17 is a view on the scale of FIG. 16 illustrating the construction and positioning of guide rail means for guiding an upper or head frame of the apparatus in its movement with respect to and on the intermediate frame;

Figure 19:
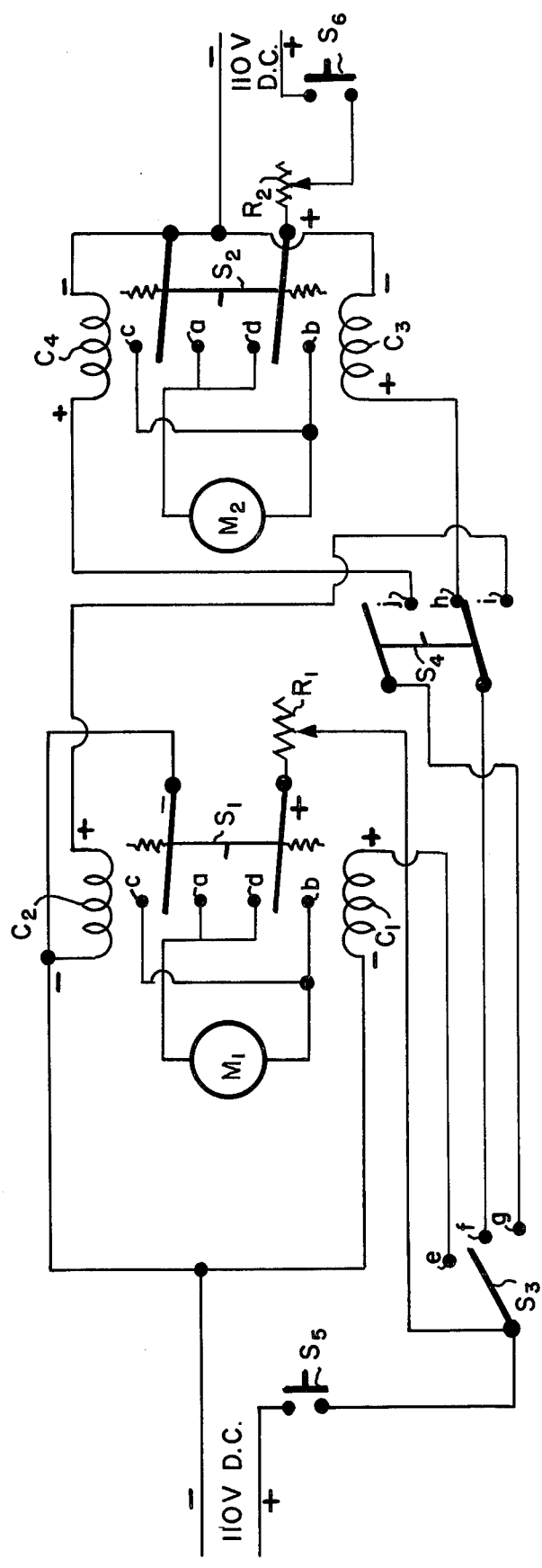

And, FIG. 19 is a circuit diagram illustrating switch and servo motor or relay means for controlling the operation of a pair of frame moving motors.

DESCRIPTION OF THE PREFERRED EMBODIMENT

Figure 1:
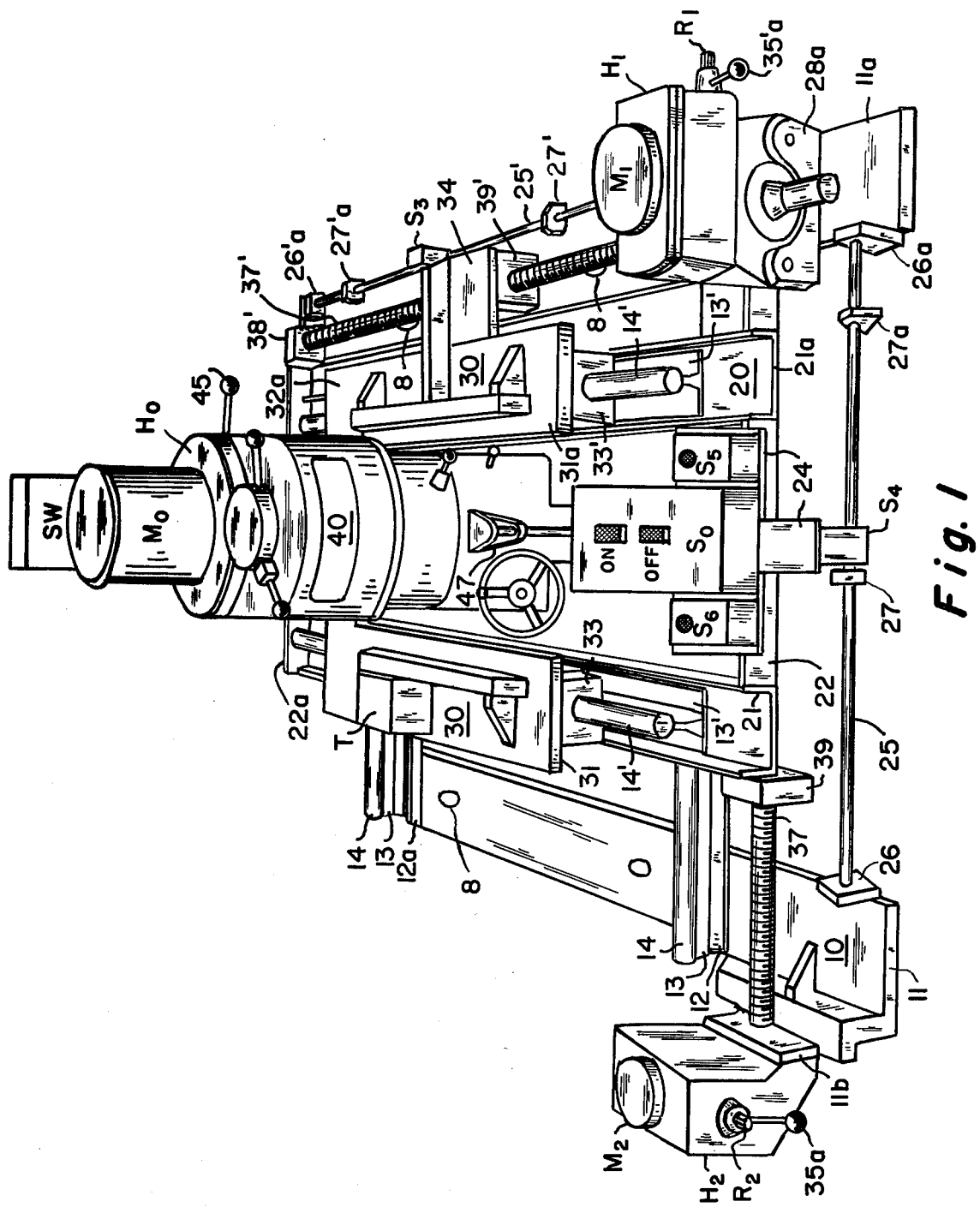
FIG. 1 is a front perspective view in elevation of an apparatus or machine constructed for operation in accordance with the invention.
Figure 2:
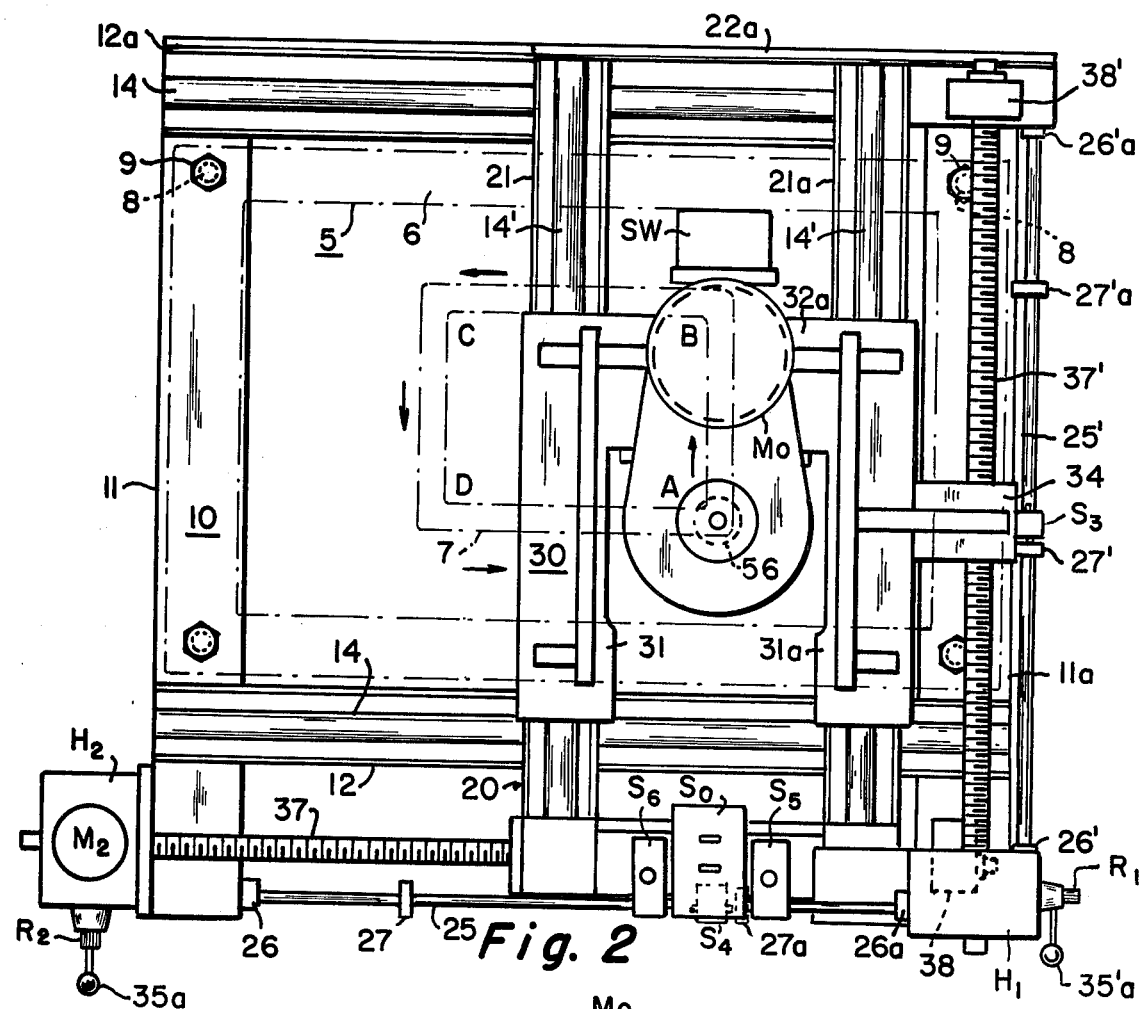
FIG. 2 is a top plan view on a reduced scale with respect to FIG. 1 showing the apparatus in what may be termed a starting position for continuous milling-around movement of its head, and that has been labeled for illustrative purposes as position A.
Figure 3:
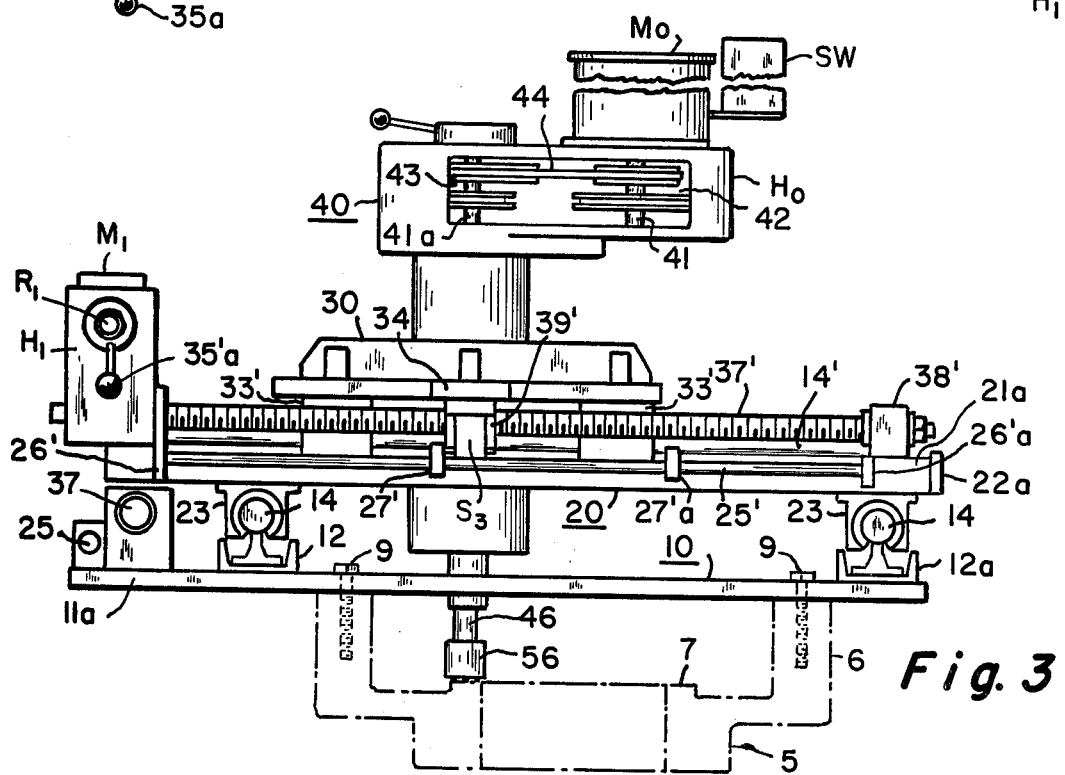
FIG. 3 is a right hand side view in elevation on the scale of FIG. 2 showing the apparatus in the same milling position.
Figure 4:
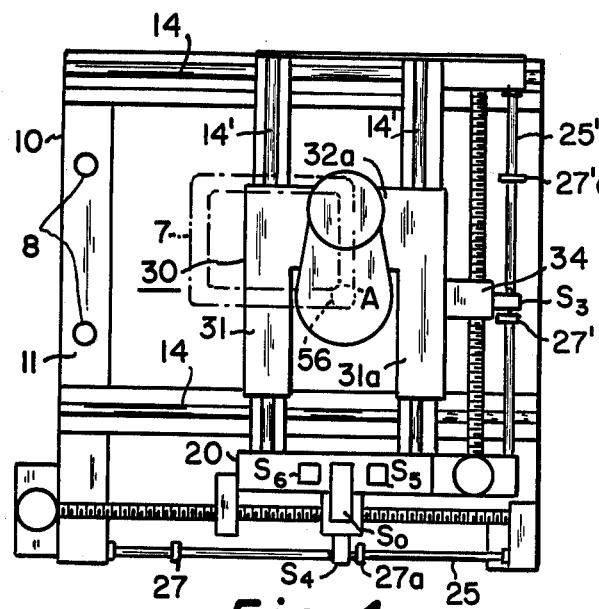
FIGS. 4, 5, 6 and 7 are greatly reduced plan views of the apparatus of FIGS. 2 and 3 with manual switch mechanism therefor omitted to particularly illustrate the relative positioning of control parts of the apparatus when its milling head has been moved to position A of FIG. 4, position B of FIG. 5, position C of FIG. 6 and position D of FIG. 7.
Figure 5:
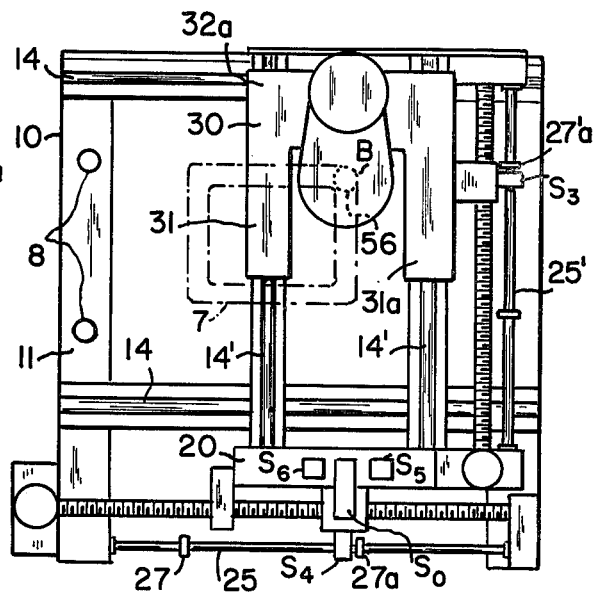
Figure 6:
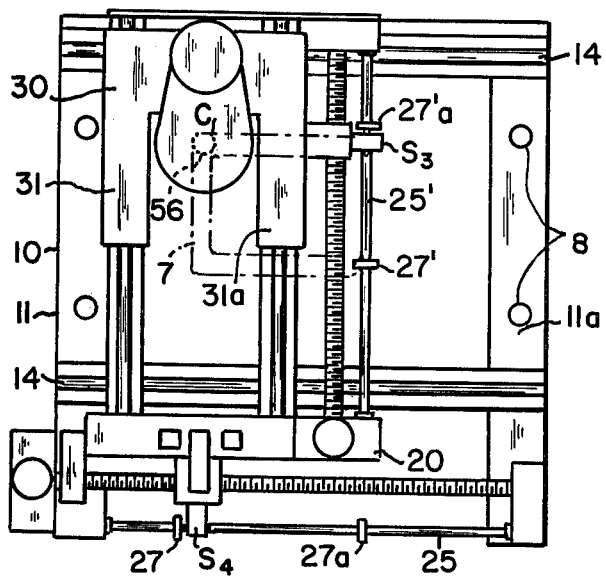
Figure 7:
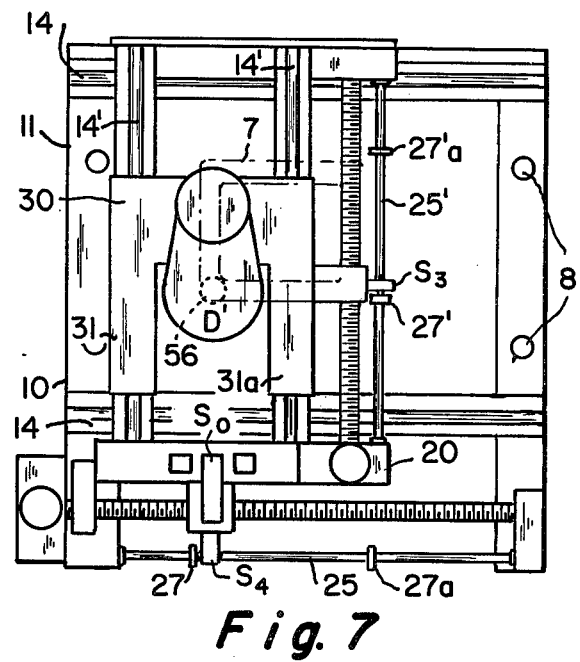

Referring particularly to FIGS. 2 and 3 of the drawings, a machine or apparatus of the invention is shown in a removable, securely mounted, operating position with respect to and on an open window or upright door frame 6 of a coke oven 5 by means of bolts 9 that extend through a pair of holes 8 (see FIG. 1) in each of a pair of longitudinally extending, transversely spaced-apart, side frame members 11 and 11a of a fixed base frame 10. The bolts 9 may be the bolts which are used to normally secure a furnace door in position over a door opening or window of a coke oven. As shown particularly by the dot and dash lines of FIG. 3, inner reaches of the upright frame 6 have a substantially planar sealing rim or flange 7 which is to be milled by the machine. The sealing flange 7 is normally employed as sealing means in engagement with a planar, complementary sealing rim or flange portion of a removable coke oven door (not shown). FIGS. 2 to 7, inclusive, show the outwardly offset, continuous rectangular shape and positioning of the sealing flange 7', representative position-indicating alphabetical references A to D, inclusive, are shown at its corners.

The stationary, base, lower supporting, fixed frame 10 of the machine has its transversely spaced-apart, parallel longitudinal, side-extending frame members 11 and 11a connected together at its opposite ends by front and back positioned, cross-extending channel members 12 and 12a. A front, cross-extending, movement-controlling rod 25 (see also FIG. 14) is mounted at its opposite ends on upstanding ears or lugs 26 and 26a that project upwardly from the side frame members 11 and 11a. The members of the base frame 10 define a substantially rectangular, centrally open area therebetween. With particular reference to FIG. 16, each cross-extending channel member 12 and 12a supports an inverted T-shaped, upright, rail support member 13 which, in turn, supports and mounts a guide rail 14 of circular or round cross-section. Bolts 15 which extend upwardly from the base of the member 13 secure an associated rail 14 in position thereon. Each rail support member 13 may be secured on its associated frame member 12 (12a) by nut and bolt assemblies 16.

Again referring to FIG. 1, the base frame 10 and particularly its side member 11, is provided with an upright side flange 11b on which is securely mounted a servo control unit $H_2$. The unit $H_2$ journals a screw shaft 37 that is driven by a reversible electric motor $M_2$ for selective forward and backward movement to move an intermediate, secondary or lower movable frame 20 transversely back and forth on and with respect to the base frame 10. A screw block 39 is secured to project downwardly from a side frame member 21 of the movable frame 20, and has a complementary female threaded bore to receive the shaft 37, whereby rotation of the latter may be employed to move the frame 20 transversely back and forth. Also, as shown in FIGS. 1 and 14, the cross-extending, front-positioned control rod 25 is adapted to carry a pair of adjustable stops 27 and 27a thereon. These stops, as will be hereinafter indicated, are adapted to control the operation of a micro switch $S_4$ (see also FIG. 19).

The lower movable frame 20 is shown provided with a pair of upwardly open, channel-shaped, parallel, longitudinally extending, and transversely spaced-apart, side frame members 21 and 21a which are connected together at their opposite ends by front and back, upright, cross members 22 and 22a to define a substantially rectangular open central area. Referring particularly to FIGS. 3 and 16, the movable frame 20 has a pair of transversely extending, under-positioned, hollow rail guide members 23 which are adapted to journal or slidably engage with and ride in a complementary relation on the guide rails 14 of the frame 10. In this connection, it will be noted that each guide member 23 has a bore of circular section which slidably receives an associated rail member 14 and retains it thereon.

Figure 8:
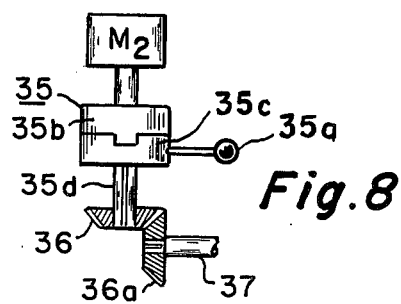
FIG. 8 is an enlarged somewhat fragmental schematic view in elevation illustrating clutch and drive mechanism that is actuated by a movement producing motor and as controlled by an operating arm.

The movable secondary frame 20 also carries a switch control rod 25' that, as shown in FIGS. 1 and 2, extends along its right-hand side and is mounted on upright end lugs or ears 26' and 26' a which are secured to extend upwardly from the front and back positioned, cross frame members 22 and 22a. Like the rod 25, the rod 25' carries a pair of adjustable stops 27' and 27'a which are adapted to control or selectively operate micro switch $S_3$, see also FIG. 19. Each side frame member 21, 21a of the frame 20 carries a guide rail mounting assembly which, as shown in FIG. 17, is designated by prime numerals to indicate that it is of the same type as the assembly of the base frame 10 (see FIG. 16). The front frame member 22 has, at its right-hand end, an upright flange 28a that serves to mount a second servo unit $H_1$ thereon (see FIGS 1 and 3). The unit $H_1$ has a reversible electric motor $M_1$ for selective forward and backward movement that is employed to drive a second screw shaft 37'. The shaft 37' is journaled to extend from the unit and is connected to the motor $M_1$ by a clutch 35'. The units $H_1$ and $H_2$ are of the same construction and thus, FIG. 8 is respresentative of both; to distinguish the two, however, a prime suffix has been applied to the numeral representing the handle 35'a in FIG. 1 of the unit $H_1$. As shown in FIG. 1, a screw block 39' projects downwardly from an outwardly extending side arm portion 34 of the tertiary frame 30 to receive the shaft 37' and provide for movement of the frame 30 with respect to the secondary frame 20. The other end of the screw shaft 37' is shown journaled in a collar 38' (see FIGS. 1 and 3) that is secured to extend upwardly from the right hand end of the back-positioned cross frame member 22a of the secondary frame 20.

An upper, tertiary or movable head frame 30 has a pair of longitudinal, side-extending, transversely spaced-apart, side framing members 31 and 31a which define an open spacing at their front ends and which are connected by a cross frame portion or member 32a at their back ends to define a frame that is centrally open to receive and operatively mount a milling head unit $H_o$ to extend downwardly therefrom. The side members 31 and 31a of the upper frame 30 each carries in a downwardly suspended relation therefrom, a hollow, journaling block 33, 33' that is adapted to be slidably positioned for longitudinal front and back movement on an associated guide rail member 14'. As shown in FIGS. 1 and 17, the rail members 14' that are carried by the lower movable frame 20 are secured by parts 13', 15' and 16' on and along the side rails 21 and 21a.

Any suitable form of milling unit or head $H_o$ may be mounted in a secure relation on the upper or head frame 30 to extend through the central open area of the machine, as particularly illustrated in FIG. 1. The milling head unit $H_o$, although shown provided with tilting and other controls, does not require them and only needs a speed change assembly 40 and a mounting such that its immediate drilling head shaft 46 may be raised and lowered into a desired milling, honing or planing position to provide a suitable depth of cut or metal removal on the face or sealing surface of the rim or flange 7.

By way of example, a Bridgeport Model 200 mill table feed unit, such as manufactured by Servo Products Company, of Altadena, Calif. may be used. Requisites for a suitable milling unit $H_o$ are illustrated in representative FIGS. 9 to 11, inclusive, and its electrical motor-drive circuit is illustrated in FIG. 18.

Figure 18:
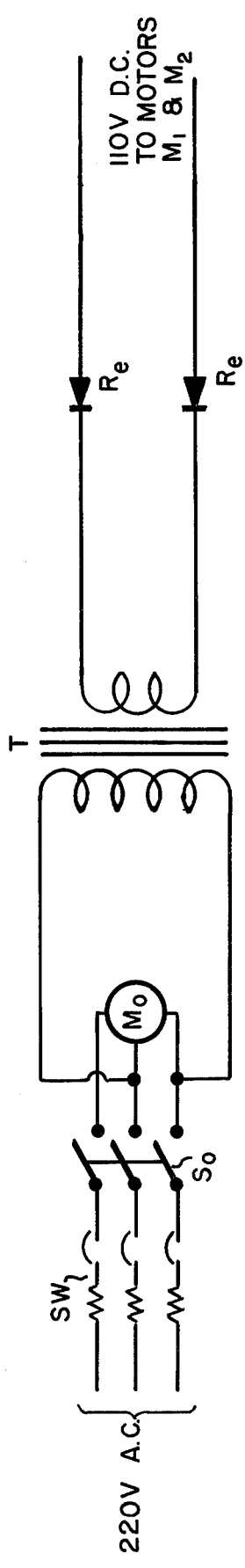
FIG. 18 is a circuit diagram illustrating the utilization of a high voltage alternating current source for activating a mill head actuating motor, and for converting the current to a lower voltage direct current for use in operating frame moving motors shown in FIG. 19.

Motor $M_o$ is illustrated in FIG. 18 as a constant speed motor actuated by 220 volts, three-phase, alternating current in an electrical circuit having a circuit breaker SW and a manual start and stop, three pole, single throw switch $S_o$. Speed control is accomplished by a pulley-belt assembly 40 (see FIG. 10). As indicated in FIG. 3, the motor $M_o$ is positioned with its shaft 41 extending downwardly to carry a pair of belt-driving pulleys 42. An upper pulley of the pair 42 is of relatively smaller diameter than the other or lower pulley. A driven shaft 41a of the unit 40 has its larger size pulley in an upper position and its smaller size pulley in a lower position. Thus, if it is desired to change the speed of drive of a mill cutting head 56, the position of belt 44 may be shifted from the upper pulleys to the lower pulleys of the pairs, and vice versa. In the speed change unit shown, the belt 44 in its upper position provides a slower speed drive of the shaft 41a than in its lower position.

Although as previously indicated, the milling unit $H_o$ may be a commercial unit, a brief description of the operation as applied to the present apparatus or machine is given to illustrate its essential operating features as used in the machine.

Referring particularly to FIGS. 9, 10, 11 and 12, the driven shaft 41a is shown provided with a hollow, downwardly open bore within which a mill drive shaft 46 is adapted to extend and with respect to which it is adapted to be slidably adjusted to accomplish a desired setting of a milling head 56. This will enable an adjustment of a depth of cut that is desirable for accomplishing the planing, honing or milling of the flange or rim portion 7. The shaft 46 carries a removable milling head 56 that is shown threaded thereon with a reverse threading to enable its retention when the head is rotated in a conventional clockwise direction. The head 56 may be of conventional construction to removably receive and securely grip cutting keys 57 that are shown in FIG. 12 as extending in a quadrant relationship from its milling face.

Vertical or "in" and "out" adjustment of the shaft 46 may be effected, as particularly illustrated in FIGS. 9, 10 and 11 by a hand wheel 55 whose shaft carries on its inner end a hand wheel operated gear 54 that meshes with a pinion 53. The pinion 53 is secured or splined on a threaded adjustment shaft 50 that is journaled on and between a pair of outwardly projecting, spaced-apart ears or lugs 51; the shaft 50 has a centrally extending, coarse screw thread to engage within a corresponding threaded bore of an adjustment cross piece 47. The other end of the cross piece 47 is slidably carried in a guided relation by a vertically extending rod 52 for movement therealong when it is raised or lowered by turning the screw 50. The rod 52 may be fixedly secured on the side of the housing (see FIGS. 1 and 11) by end-positioned mounting ears or lugs 51a.

Circuit diagram FIGS. 18 and 19 are representative of electric circuits that may be used to effect a desired operation of the apparatus disclosed. As indicated in FIG. 18, a step-down transformer T is employed to reduce the voltage from 220 volts to 110 volts, and a pair of rectifiers Re are used to provide full wave rectification in order that variable speed, direct current driven motors $M_1$ and $M_2$ may be used. Conventional equipment, such as a Square D circuit breaker SW and a Square D "stop" and "start" switch $S_o$ may be used in the circuit of FIG. 18. FIG. 19 shows a main operating circuit which may be employed for automatically, progressively effecting a complete encircling milling or full cycle continuous operation along a sealing flange 7 from a starting position represented as A to positions B, C and D, to return to the starting position A.

In FIG. 19, switch $S_1$ is shown as a two-blade or pole, dual-throw type with four contact points for controlling forward and reverse movements of the direct current driven motor $M_1$. Switch $S_2$ is a similar type for controlling the forward and reverse movements of direct current driven motor $M_2$. Coils $C_1$ and $C_2$ are electrically energized relay or servo, switch operating coils for selectively moving the switch $S_1$ from a spring-urged open position to and holding it in a closed position with respect to contact points $a$ and $b$ and contact points $d$ and $c$. When coil $C_1$ is electrically energized, it will move the blades $S_1$ against an opening force exerted by its tension springs, to a closed position on points $a$ and $b$ to thus energize the motor $M_1$ in a forward or clockwise direction. On the other hand, the coil $C_2$ when energized will move into and retain the arms of the switch $S_1$ in contact with points $c$ and $d$ to thereby actuate the motor $M_1$ in a reverse or counterclockwise direction. The coils $C_3$ and $C_4$ operate in the same manner to cause a selective closing of the switch $S_2$ for driving the motor $M_2$ respectively in a forward clockwise direction and in a reverse counterclockwise direction.

Each of a pair of switches $S_5$ and $S_6$ may be of a push-button-actuated, manual-operated type that upon an initial "in" movement will close its arm upon a pair of contacts and upon a second or following "in" position movement will cause a release of its arm with resepct to the contacts to open it. Switches $S_3$ and $S_4$ may be micro switches whose arms are respectively controlled by adjustable stops 27', 27'a and 27 and 27a. It will be noted that the first group or prime designated stops is carried by a side-extending control and 25', and that the second group of stops 27 and 27a is carried by front-extending control rod 25. Speed controls rheostats, designated as $R_1$ and $R_2$, are provided for the respective motors $M_1$ and $M_2$ and are carried by the servo units $H_1$ and $H_2$, see particularly FIG. 1. The servo units $H_1$ and $H_2$ may be adjusted by turning knob dials of their respective rheostats $R_1$ and $R_2$ to a desired speed and preferably, to the same speed for both the motors $M_1$ and $M_2$.

In starting the operation of the machine for automatic movement through a complete cycle of positions from A back to A through B, C and D, the starting switch $S_o$ may be closed (moved to its "start" position) to energize the milling head motor $M_o'$ and thus, cause rotation of the head 56 in position on the flange 7. Then, the pushbutton switches $S_5$ and $S_6$ may be closed, and the arm or finger of switch $S_3$ may be manually moved into contact with point $e$. This will (assuming A as the starting position, see FIG. 4) energize the coil $C_1$ to move the arms of the switch $S_1$ into engagment with the contacts $a$ and $b$ and thus, actuate the motor $M_1$ in a forward direction to cause the screw shaft 37' to advance the upper or head movable frame 30 backwardly to a position at which the milling head 56 has reached position B on the door flange 7. During this time, the cutters 57 of the milling head 56 will be progressively planing the portion of the flange 7 that extends from positions A to B. If, for any reason, it is desirable to stop this movement, a manual control arm 35'$a$ of clutch 35 of the servo unit $H_1$ may be disengaged (see FIGS. 1 and 8); also alternatively, push button switch $S_5$ may be pushed to open its contacts. After any necessary adjustment has been made, parts 35$b$ and 35$c$ of the clutch 35 may be reengaged to again actuate stud shaft 35$d$, cooperating gears 36 and 36$a$ and screw shaft 37', to continue the movement, all without stopping the motor $M_1$.

When the head 56 reaches position B, then stop 27'$a$ strikes the finger blade of micro switch $S_3$ to move it from engagement with contact $e$ into engagement with contact $f$. This immediately causes a de-energization of the coil $C_1$ and a return of motor control switch $S_1$ to its "open" position under the urging of its tension springs. Since micro switch $S_4$ at this time has its one arm open and its other arm closed on contact point $h$ (see the position shown in FIG. 19), the closing of the switch $S_3$ on point contact $f$ will cause an energization of the coil $C_3$ to thus move the arms of the switch $S_2$ from their spring-held "open" position into engagement with contact points $a$ and $b$. This produces a forward actuation of the motor $M_2$ which, in turn, produces an actuation of screw shaft 37 to advance the lower frame 20, and thus the upper frame 30 thereon, from right hand position B towards position C.

When the milling head 56 reaches position C, the setting of the adjustment stop 27$a$ is such that it strikes the finger of micro switch $S_4$ to move it from the position shown in FIG. 19 to a second position at which its arms engage contacts $j$ and $i$. This produces a flow of current from the contact $i$ to energize the coil $C_2$ and thus, moves the arms of switch $S_1$ from their "open" position into engagement with contact points $c$ and $d$. The motor $M_1$ is then energized in a reverse direction to reverse the movement of the screw 37' and move the upper frame 30 forwardly on the frame 20 until the stop 27' engages the finger or arm micro switch $S_3$, at which time, the milling head 55 has reached position D. This causes a movement of the arm of the switch $S_3$ into engagement with contact $g$. This de-energizes holding coil $C_2$ to thus cause the switch $S_1$ to return to its "open" position. Energy now flows from contact $g$ of switch $S_3$ through closed contact $j$ of switch $S_4$ to thus energize the coil $C_4$. The coil $C_4$ now moves the arms of the switch $S_2$ from their "open" position into and holds them in engagement with the contacts $c$ and $d$ to thus actuate the motor $M_2$ in a reverse direction. As a result, the shaft 37 now advances the lower movable frame 20 to move the milling head 56 from position D back to starting position A.

Upon reaching position A and thus completing a full encircling path of movement of the milling head 56, stop 27 engages the finger of switch $S_4$ to return it to its half open, starting position shown in FIG. 19 to thus de-energize the coil $C_4$ and permit the spring-loading of motor operating switch $S_2$ to return to its normally "open" position. At this time, the entire electrical circuit of FIG. 19 is de-energized, thus requiring a manual movement of the arm of the switch $S_3$ from contact $g$ back to $e$ position to start the operation once again in the manner above indicated. As will be appreciated, the switches $S_5$ and $S_6$ and the clutches 35 and 35' may be operated manually to initiate and stop operations at any length extent of the flange 7 that is being honed, planed or milled. A continuous automatic operation is preferred, in that a constant speed and a desired depth of honing action may be maintained for the full length extent of the flange 7.

It will thus appear that the continuous advancing movement is, in effect, a two-step advancing and a two-step returning movement from the standpoint of the secondary and tertiary frames and the milling head.

Although the apparatus shown is particularly applicable to the dressing of, for example, a cast iron flange or rim of an inspection door frame of a coke oven, it will be apparent that a type of movement other than a closed linear or straight-line rectangular type may be attained where the rim to be dressed by carbide milling head cutter keys 57 is, for example, of a different continuous, encircling or enclosing shape such as an ellipse. In such event, however, the cooperating rail and guide means between the fixed frame and the secondary movable frame and between the secondary frame and the movable head frame will be shaped accordingly. Also, the rods 25, 25' which carry the adjustable switch operating stops will also have to be given a corresponding curved shape. However, the basic principle of operation of the main parts of the apparatus will be the same. Control of the operation may be effected in the same manner as before set forth.

For the particular application of, in effect, truing, shaping and dressing the sealing flange 7 of a coke oven door frame, the milling head 56 may be provided with about a six inch "up" and "down" adjustment, using representative apparatus such as shown in FIG. 11. The speed of the movement of the secondary and head frames may be in the neighborhood of about one half to 12 inches per second. Adjustment for the depth of cut of the keys or elements 57 for each closed or encircling movement will, as an optimum, be about 1/16 to 3/32 of an inch. A depth of cut of up to about one fourth of an inch may be effected using a slower speed of operation of the head 56. A typical coke oven inspection door may have a size of about 10 × 14 inches. The speed of rotation of mill head 56 may be adjusted between a relatively slow rate of about 300 to 400 rpm and a higher rate of about 900 to 1000 rpm.

I claim:

1. In a portable machine for truing a continuous door sealing flange of a high temperature furnace or oven, a substantially rectangular base support frame having a pair of transversely spaced-apart substantially parallel longitudinal side members and a first pair of spaced-apart parallel rail members connected across said pair of side members and defining an open central portion therewith, means for removably securing said base support frame in position with respect to the flange being trued, a movable secondary frame having a pair of transversely spaced-apart substantially parallel longitudinal side members and a pair of spaced-apart parallel transverse end members connected across said pair of side members and defining an open central portion therewith, said secondary frame having rail-engaging means for moving it for back and forth movement along said first pair of rail members transversely across said base support frame, a second pair of spaced-apart parallel rail members mounted to extend longitudinally along said pair of longitudinal side members of said secondary frame, an overhead tertiary frame having a pair of transversely spaced-apart parallel longitudinally extending side members and having rail-engaging means for mounting said tertiary frame for back and forth movement along said second pair of rails with respect to said secondary frame in a substantially right angular direction with respect to movement of said secondary frame along said base support frame, said tertiary frame defining an open central portion, motor-driven milling means operatively carried by said tertiary frame and having a truing head extending therefrom through the open central portions of said tertiary and secondary and base support frames for engagement with and movement along the door sealing flange as effected by movements of said tertiary and secondary frames with respect to said base support frame and each other, first motor means mounted on one longitudinal side member of said base support frame, a first screw shaft at one end operatively connected to said first motor means and extending therefrom transversely of said base support frame, a first screw block carried by one longitudinal side member of said secondary frame and receiving a forward end portion of said first screw shaft therein for moving said secondary frame transversely back and forth along said first pair of rails with respect to said base support frame, a second motor means mounted adjacent one end of and on the other longitudinal side member of said pair of said secondary frame, a second screw shaft at one end operatively connected to said second motor means and extending forwardly therefrom longitudinally of said secondary and tertiary frames, a second screw block carried by one longitudinal side member of said tertiary frame and receiving a forward end portion of said second screw shaft therein for moving said tertiary frame longitudinally back and forth with respect to said secondary frame, electrical control means for automatically progressively actuating said first and second motor means forwardly and then backwardly to, in sequence, forwardly advance said secondary and tertiary frames and to, in sequence, backwardly retract them to move said truing head in a full cycle continuous encircling path along the door sealing flange, said control means having switch means for automatically stopping movement of said secondary and tertiary frames on completion of the full cycle path of movement, and said control means having manual means for stopping the automatic progression of said frames at any selected position of their movements and for then thereat reinitiating their automatic progression to continue the truing operation.

2. A portable truing machine as defined in claim 1 wherein said control means comprises a servo control unit for each said motor means, each said servo unit is mounted in an assembled relation with an associated said motor means, and each said servo control unit has a manually operated clutch to connect each said first and second motor means with and disconnect it from its associated said screw shaft.

3. A portable truing machine as defined in claim 2 wherein said electrical control means comprises, a dual-pole four-contact normally open switch means for each said first and second motor means, a pair of electrically energized solenoids for each said switch means to selectively move each of said switch means between contact positions in which said first and second motor means is selectively operated in forward and reverse directions and each said motor means is selectively operated with respect to the other, and limit switch means operatively carried by said secondary and tertiary frames for actuation at desired advanced positions of said frames that are attained by forward and backward movements of said frames to selectively energize each of said pairs of solenoids and effect the defined selective operation of said first and second motor means.

4. A portable truing machine as defined in claim 1 wherein said electrical control means has push-button switch means to energize and de-energize said control means for starting and stopping said first and second motor means during any portion of the operating cycle of the machine.

5. A portable truing machine as defined in claim 1 wherein said electrical control means comprises, a dual-pole four-contact normally open switch means for each said first and second motor means, a pair of electrically energized solenoids for each said switch means to selectively move each of said switch means between contact positions in which said first and second motor means is selectively operated in forward and reverse directions and each said motor means is selectively operated with respect to the other, and limit switch means operatively carried by said secondary and tertiary frames for actuation at desired advanced positions of said frames that are attained by forward and backward movements of said frames to selectively energize each of said pairs of solenoids and effect the defined selective operation of said first and second motor means.

* * * * *